United States Patent [19]

Salihar

[11] Patent Number: 4,551,261
[45] Date of Patent: Nov. 5, 1985

[54] DUST SUPPRESSION WITH ELASTOMER-CONTAINING FOAM

[75] Inventor: Mark W. Salihar, Berwyn, Ill.

[73] Assignee: Dearborn Chemical Co., Lake Zurich, Ill.

[21] Appl. No.: 607,826

[22] Filed: May 7, 1984

[51] Int. Cl.⁴ ............................................. C09K 3/22
[52] U.S. Cl. ................................. 252/88; 252/174.23; 252/DIG. 2
[58] Field of Search ............... 252/88, 174.23, DIG. 2

[56] References Cited

U.S. PATENT DOCUMENTS

| | | | |
|---|---|---|---|
| 2,854,347 | 9/1958 | Booth et al. | 117/6 |
| 3,954,662 | 5/1976 | Salyer et al. | 252/382 |
| 4,087,572 | 5/1978 | Nimerick | 427/215 |
| 4,136,050 | 1/1979 | Brehm | 252/88 |
| 4,171,276 | 10/1979 | Brehm | 252/88 |
| 4,380,459 | 4/1983 | Netting | 252/DIG. 2 |
| 4,417,992 | 11/1983 | Bhattacharyya et al. | 252/88 |

FOREIGN PATENT DOCUMENTS

| | | | |
|---|---|---|---|
| 57-98579 | 6/1982 | Japan | 252/88 |
| 453421 | 1/1975 | U.S.S.R. | 252/88 |

*Primary Examiner*—Paul Lieberman
*Assistant Examiner*—Robert A. Wax
*Attorney, Agent, or Firm*—Mark T. Collins; William W. McDowell, Jr.

[57] ABSTRACT

The generation of dust by coal and other solid particulate materials is suppressed by the application of a foam which comprises water, a foaming agent, and an elastomeric water insoluble polymer.

11 Claims, No Drawings

DUST SUPPRESSION WITH ELASTOMER-CONTAINING FOAM

The present invention relates to dust suppression and more particularly to dust suppression with an elastomer-containing aqueous foam that coats the surface of solid, particulate dust-generating materials.

Dust suppression is the reduction of the extent to which finely divided solid particulate material becomes suspended in air. A variety of materials such as coal, sulfur, phosphate, clay, and other finely divided ores and minerals generate dust in transfer and handling operations during mining, transportation, storage, and use.

Dust is a particularly severe safety and health hazard in coal mining, handling, and storage operations. Coal is subject to the chipping off of small fragments by the action of wind and rain, frictional movement due to motion in transit, and abrasion in handling. Respirable coal dust has a particle size of less than about 10 microns and its inhalation can lead to pneumoconiosis, more commonly known as black lung disease. Dust explosions due to spontaneous combustion may occur when the dust is confined within a small air space such as in coal mining operations.

U.S. Pat. No. 3,954,662 of Salyer et al. discloses aqueous foamable compositions and their use to suppress coal dust. The compositions contain water, an interpolymer of a polymerizable vinyl ester and a partial ester compound interpolymerizable with the vinyl ester, and a detergent wetting agent. Interpolymers which are soluble in water at room temperature in the amount required in the composition such as vinyl acetate/maleic anhydride copolymer esters are preferred. The interpolymer binds the coal dust and keeps the dust particles encapsulated after the foam has collapsed. The interpolymer also gives body to the foam and thus promotes the desired degree of stability of the foam which in most cases should be of limited duration so as not to interfere with mining operations. The detergent wetting agent promotes foaming and wetting of the coal by water.

In U.S. Pat. No. 4,087,572 of Nimerick, a combination of an organic polymer latex such as a styrene-butadiene interpolymer and a silicone is applied to the surface of a coal pile or other mass of finely divided particulate material. An additional wetting agent, in addition to the one used in making the latex, may be incorporated to prevent premature coagulation of the latex and enhance wetting and penetration by the latex. The combination may be applied as an aqueous mixture such as by spraying.

U.S. Pat. No. 4,417,992 of Bhattacharyya et al. describes a coal and other mineral dust control method in which the mineral is sprayed with a liquid dispersion of a highly branched water swellable polymer of acrylamide or an acrylamide-acrylic acid copolymer branched and/or cross-linked with a multifunctional unsaturated monomer containing more than one ethylenically unsaturated group. The dispersions of the examples contain nonylphenol ethoxylate.

According to U.S. Pat. No. 2,854,347 of Booth et al., elastomeric substances such as styrene-butadiene copolymers are applied to the surface of coal and other minerals. The elastomeric film immobilizes dust and prevents water and wind erosion. The elastomers may be sprayed on the surfaces in latex form. The surfaces are preferably pre-wet with water or solutions of suitable wetting agents in water to lessen the quantity of elastomer needed.

U.S. Pat. Nos. 4,136,050 and 4,171,276 of Brehm describe a dust suppression method in which the dust particles are treated with an aqueous solution of alkylphenoxy polyethoxy ethanol and a copolymer of ethylene oxide and propylene oxide. The particles are preferably treated by spraying the solution on their surfaces.

The present invention provides a method of suppressing dust generation by solid particulate material. The method comprises applying to the material a dust-suppressing amount of a foam comprising water, a foaming agent, and an elastomeric water insoluble polymer. The foam of the present invention provides immediate dust suppression and ease of application. The polymer coats the material and continues to suppress dust generation during handling of the material after the foam has collapsed and ceased to be effective in suppressing dust. In addition, the inclusion of the polymer permits a single foam application rather than the multiple applications required for prior foam dust suppressants during lengthy handling periods without any decrease in the suppression of dust and permits short term storage of the treated material without excessive dust generation. The elastomeric polymer does not interfere with the generation of foam having the desired degree of expansion and duration at low foaming agent to water ratios.

An elastomeric water insoluble polymer binder is used in the method of the present invention. The elastomeric polymer is capable of forming a substantially continuous and water insoluble film when applied to the surface of the solid material and air dried. The polymer particles are soft enough to coalesce under the forces that arise during air drying of the film and bind the particles at the surface into a adherent coating.

Suitable elastomeric and water insoluble synthetic organic polymer binders include, for example, the synthetic rubber-like polymers, such as copolymers of butadiene with a monoolefinic monomer such as styrene, methylstyrene, dimethylstyrene, and acrylonitrile. Other suitable polymers are the copolymers of methyl, ethyl and butyl acrylates with acrylonitrile or with styrene in proportions that produce elastomers. Plasticized polyvinyl acetate, plasticized polyvinyl chloride, plasticized polystyrene, plasticized substituted polystyrenes, and plasticized polyolefins such as polyethylenes and polyisobutylenes may also be used. Styrene-butadiene copolymers are preferred.

The synthetic polymers are preferably used as a latex, that is, a dispersion of the water insoluble synthetic polymer or copolymers in an aqueous medium such as that ordinarily obtained by an emulsion polymerization process. Suitable solutions of the elastomer in organic solvents such as, for example, methyl ethyl ketone, toluene, and other hydrocarbon solvents may also be used. Typical organic polymer latexes include those of the interpolymers of no more than about 80 weight percent of alkenyl aromatic monomers, such as styrene and vinyl toluene, with open chain conjugated diolefins, such as butadiene and isoprene optionally with at least one other ethylenically unsaturated monomer, such as acrylic or methacrylic acid, an alkyl acrylate, or like monomer. Other useful latexes are those of polyolefins such as polyisobutylene, polyisoprene and the like. Also polyvinyl alkanoate latexes, such as those of polyvinyl acetate and polyvinyl propionate, may be employed. The various film-forming polymers of the alkyl acrylates and methacrylates also may be used. Suitable commercially available elastomeric latexes include copolymers of butadiene with styrene, acrylonitrile, isobutylene, isoprene, and neoprene. A modified styrene-butadiene copolymer latex such as Darex 3333 of W. R. Grace & Co. is especially suitable.

The foaming agent used in the present invention promotes foaming and wetting and penetration of the solid material. A variety of surfactants and detergent wetting agents are known foaming agents. Any surfactant that promotes foaming and is compatible with the organic binder may be used. Typically, anionic and nonionic surfactants and combinations thereof are used to provide a foam of the desired expansion and duration.

Suitable anionic surfactants include alkyl aryl sulfonic acids, alkyl sulfonic acids, alkenyl sulfonic acids, sulfonated alkyls, sulfonated alkenyls, sulfated monoglycerides, and sulfated fatty esters. Such anionic detergents include the long chain alpha olefin sulfonates; water soluble salts of alkenyl sulfonic acid such as the sodium salt of $C_{14}$-$C_{16}$ alphaolefin sulfonates; water soluble alkyl aryl sulfonic acid salts such as sodium alkylnaphthalene sulfonate and sodium alkyl benzene sulfonate; water soluble salts of sodium lauryl sulfate; and water soluble salts of sulfated monoglyceride. A sodium alkyl ether sulfate anionic surfactant such as Cycloryl NB60 of Cyclo Chemical Corporation is especially suitable. Suitable nonionic wetting agents include ethylene oxide condensates of nonyl- or octylphenol, ethylene oxide condensates of straight chain alcohols, fatty acid amides, and coconut alkanolamides. A coconut oil alkanolamide such as Ninol 128 Extra of Stepan Chemical Company is especially suitable.

Combinations of an anionic surfactant and a nonionic surfactant are preferably used in producing foams in accordance with the present invention. The foaming agent may comprise an anionic surfactant and a nonionic surfacant in a weight ratio of from about 20:1 to about 1:10. Preferably, the weight ratio of anionic surfactant to nonionic surfactant is from about 10:1 to about 2:1.

The foam comprises water, the foaming agent, and the binder. The foaming agent is present in an amount that is effective to promote foaming and wetting of the solid material by water. The elastomeric polymer is present in a minor amount by weight that is effective to bind the solid material and suppress dust. The foaming agent and the binder are generally present in a weight ratio of from about 5:95 to about 95:5, preferably of from about 1:10 to 10:1, and especially of from about 5:1 to 1:1. A foamable composition may be prepared by mixing the foaming agent and binder with water to form an aqueous concentrate containing from about 20 to about 40 weight percent water and diluting the concentrate with water for foam generation.

The foamable composition may contain minor amounts of additional conventional ingredients such as corrosion inhibitors for metallic surfaces which the foam may contact and an acid to adjust the pH for compatibility with the surfactant. Sodium benzoate and sodium tetraborate pentahydrate are typical corrosion inhibitors and concentrated sulfuric acid may conveniently be used to adjust the pH.

In the method of this invention, a foam comprising water, the foaming agent and the elastomeric water insoluble polymer is applied to a solid particulate dust generating material. A foam is a mass of gas bubbles dispersed in a liquid matrix. In the present invention, the liquid is water and the gas is usually air because of their low cost and compatibility with the foaming agent.

The present invention preferably employs a foam having an expansion ratio of at least about 10:1 and preferably of from about 20:1 to about 200:1. The expansion ratio is the ratio of the volume of foam produced to the volume of the foamable compostion from which the foam is generated. In order to trap small solid particles, the foam bubbles preferably have an average diameter of less than about 0.015 inch and especially of between about 0.005 and about 0.015 inch.

The foamable composition of water, foaming agent, and binder is agitated to convert it into a foam. The foam is typically generated by mixing compressed air with the foamable composition and pushing the resulting pressurized mixture through a screen or other multiple orifice diffusion device to entrap the air and produce the foam. The foam is preferably generated by pushing the mixture through a diffusion device having a myriad of tortuous interconnecting passages such as a stainless steel or polyurethane sponge comprised of thin, interwoven strands. A stainless steel household kitchen scouring pad is typically used. Generally, the foams of the present invention are produced at a water to binder and foaming agent volume ratio of from about 300:1 to about 15:1 and preferably of about 75:1 to about 20:1 and an air pressure of about 25 to about 75 pounds per square inch (psi) and an air speed of about 5 to about 30 standard cubic feet per minute (SCFM). Preferably, the air pressure is about 40 to about 60 psi and the air speed is about 15 to about 25 SCFM. In practice, the foam may be conveniently generated by inserting sufficient scouring pads to fill the entire cross sectional area of a 3 inch by 36 inch cylindrical pipe and operating at an air pressure of 40 to 60 psi and air speed of 15 to 25 SCFM and a water to binder and foaming agent volume ratio of 40:1 to 70:1.

The foam may be discharged from the foam generator through a flexible pipe or hose nozzle for application to the material to be treated. The foam of the present invention may be applied to moving coal, for example, on a belt conveyor which transfers coal or in free fall from one support to another.

The amount of the foam that will be effective to suppress dust will vary. Generally from about 0.2 to about 15 and typically from about 0.5 to about 5 pounds of the foam is applied per 100 square feet of surface area of the solid material.

The present invention is further illustrated by the following examples in which all parts are by weight unless otherwise indicated.

EXAMPLES

A foamable composition was prepared by mixing 54.55 parts of water, 20 parts of Cycloryl NB60 sodium alkyl ether sulfate anionic surfactant of Cyclo Chemical Corporation, 5 parts of Ninol 128 Extra coconut oil alkanolamide nonionic surfactant of Stepan Chemical Company, 20 parts by weight of Darex 3333 modified styrene-butadiene copolymer latex of W.R. Grace & Co., 0.1 part of sodium benzoate, 0.2 part of sodium tetraborate pentahydrate, and 15 parts of concentrated sulfuric acid.

The dust suppressant activity of foams produced from this foamable composition was evaluated in a series of tests on lignitic coal at a major western United States power generating utility. The foam was generated by mixing the composition with water and pumping the mixture and compressed air through a 3 inch by 36 inch cylindrical pipe filled with stainless steel scouring pads. The foam was applied to the coal at the primary crusher, secondary crusher, and secondary fines bypass points in the utility's coal handling system with the exception of Example 3 in which the foam was applied at the primary and secondary crushers only. The ratios of the volume of water mixed with the foamable compostion, air pressures, the volumes of the mixture applied per ton of coal, and the dust suppression results are shown in the following table.

| Example No. | 1 | 2 | 3 | 4 | 5 |
|---|---|---|---|---|---|
| Water to foamable composition volume ratio | 60:1 | 45:1 | 50:1 | 60:1 | 60:1 |
| Air pressure | 60 | 37 | 60 | 60 | 60 |
| Gallons of water/foamable composition mixture per ton of coal | 0.55 | 0.51 | 0.51 | 0.66 | 0.55 |
| Wind speed (miles per hour) | Minimal | 15 mph | 5–10 mph | 10–15 | Minimal |
| Reduction (%) | 70–85 | 60–70 | 80–85 | 65–70 | 75–80 |

The results demonstrate the unexpected effective dust suppression provided by the present invention.

I claim:

1. The method of suppressing dust generation by a solid particulate material comprising applying to the material a dust-suppressing amount of a foam comprising water, a foaming agent and an elastomeric water insoluble polymer, said foam having a weight ration of the foaming agent to the polymer of from about 5:95 to about 95:5.

2. The method of claim 1 in which the polymer is an organic polymer latex.

3. The method of claim 1 in which the polymer is a copolymer of styrene and butadiene.

4. The method of claim 1 in which the foaming agent is an anionic surfactant.

5. The method of claim 1 in which the foaming agent comprises an anionic surfactant and a nonionic surfactant.

6. The method of claim 5 in which the weight ratio of anionic surfactant to nonionic surfactant is from about 10:1 to about 2:1.

7. The method of claim 5 in which the foaming agent comprises a sodium alkyl ether sulfate and a coconut oil alkanolamide.

8. The method of claim 1 in which the weight ratio of the foaming agent to the polymer is from about 1:10 to 10:1.

9. The method of claim 1 in which the foam is applied to moving coal.

10. The method of claim 1 in which the foam has an average bubble diameter of less than about 0.015 inch.

11. The method of claim 1 in which the foam comprises water, an anionic surfactant, a nonionic surfactant, and a styrene-butadiene copolymer latex and the foam is applied to moving coal.

* * * * *